Patented Sept. 2, 1941

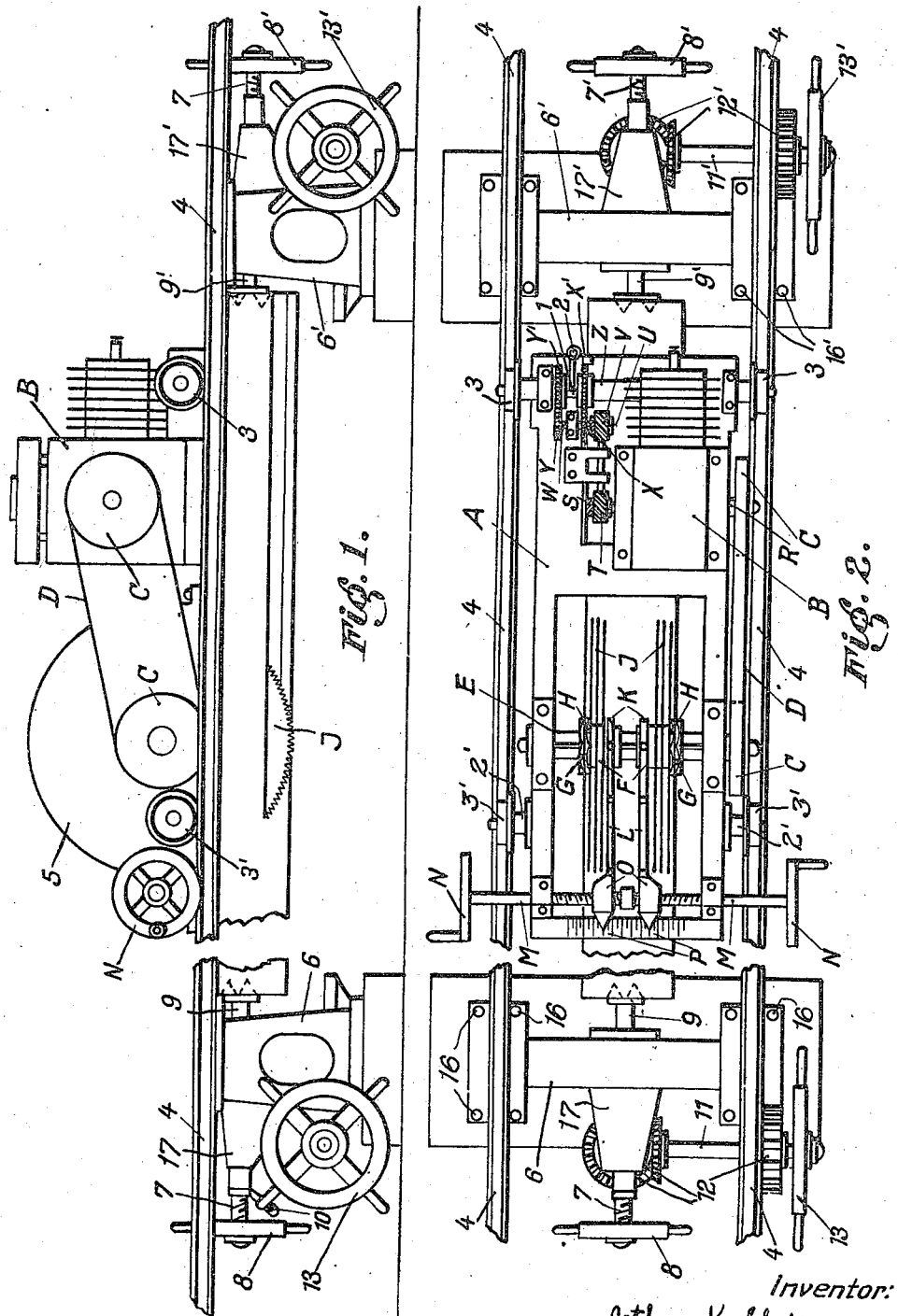

2,254,293

UNITED STATES PATENT OFFICE 2,254,293

SAWING MACHINE

Arthur Kaehlert, Berlin, Germany

Application July 2, 1938, Serial No. 217,243
In Germany July 6, 1937

1 Claim. (Cl. 143—47)

The invention relates to sawing machines for cutting timber or the like, particularly to a movable sawmill having circular blades.

Sawing machines for longitudinally cutting logs, timber, posts, sleepers, planks, etc. are, as a rule, heavy and difficult to move. These heavy-type machines operate with a stationary saw and a movable work-piece.

In order to dispense with transporting the logs from the forest to distant sawmills, it has also been proposed to construct movable sawing machines. According to a known construction of such type, the portable machine is secured directly to the log to be cut. These machines, however, have a number of drawbacks. They lack the accuracy required for many purposes. It also is not possible to completely cut the log from one side; after having finished one cutting operation, the log must be turned and the sawing machine must be secured to the opposite side. With such an arrangement, double-acting circular saws for effecting multiple cuts can be employed only with great difficulty. Also the fastening and the adjustment of such saws present considerable disadvantages.

An object of the invention is to provide a movable sawing machine which avoids the above-mentioned drawbacks.

An object, more in particular, is to construct a movable sawing machine which allows cutting the logs in two or more longitudinal planes without requiring a removal of the log from the machine.

An object also is to provide a movable machine which easily permits multiple cutting of logs throughout their entire cross section. Other objects will become apparent from the following description.

According to the invention, a movable sawing machine contains a stationary frame forming a track for a reciprocatorily supported set of saw blades and a fastening device for firmly securing the log to be cut, the device being designed to permit a rotation of the work-piece about its longitudinal axis and an adjustment of the work-piece in the vertical direction so as to ensure a cutting of the log by the saw blades throughout its cross-section. The sawing device proper consists of a set of double-acting circular saw blades and is arranged on the stationary frame in the form of a carriage or slide. According to a preferred embodiment of the invention, the spacing between the double-acting saw blades can be brought to the desired cutting width by means of an adjusting device. The saw blades are slidably arranged on a notched driving shaft by means of saw blade sleeves, and may be secured in the desired position by means of flange nuts.

Such a saw is light in weight and can be easily assembled and dismantled and may also be used in the woods on rough grounds. Of course, it may also be employed in timber yards and moved from one to another place of storage piles. A particular advantage obtained by the invention, for instance when cutting building timber and sleepers, is that waste is avoided to a great extent, since the timber may directly be cut to boards of the desired size. Another advantage is that the machine does not require a solid floor and can be arranged on a bogie wagon.

In the accompanying drawing is shown an embodiment of the invention in diagrammatic form.

Fig. 1 shows a side elevation and Fig. 2 a top view.

In the drawing, A denotes the frame of a carriage whose wheels 3 and 3' rest on rails 4 forming part of a stationary structure which comprises two spaced standards 6 and 6'. Frame A carries a driving motor B and a set of circular saws, the shaft E of which is driven by the motor by means of wheels C and belt or chain D. The frame, as well as the standards or other stationary structure, consists of light metal such as aluminum, pressed sheet steel, welded sectional iron, or the like. The shaft E is mounted in ball bearings. The shaft, further, has a longitudinal groove and carries slidable sleeves F. Saw blades I are firmly clamped on the sleeves F by means of flange nuts G and H. In each sleeve F is milled a groove in which engages a sliding fork K which is mounted on a connecting rod L. The spacing between the circular saw blades I is adjustable by means of a device comprising a left-hand and right-hand spindle M with hand-wheels N, two spindle nuts O, and the rods L connecting the nuts O with the sliding forks K. Secured to the spindle nuts are pointers P which move over a scale indicating the distance between the two sets of saw blades. A train of worm gears composed of a worm S on the shaft of motor B, a worm wheel T meshing with worm S, a worm U operated by wheel T and meshing with a worm wheel V, serves to operate a shaft W. Two sets of gears X, X' and Y, Y' serve to connect shaft W with the shaft Z of the rear carriage wheels 3. Gear wheels X and Y are firmly mounted to the shaft W, whereas wheels X' and Y' run idle on the rear shaft Z. Between wheels X' and Y', which carry coupling claws, is arranged a coupling member 1 which is slidably arranged on the rear shaft Z and engages the shaft through a groove and a feather. By means of the coupling lever 2 the coupling can be brought into engagement either with gear X' or Y', thus causing the rear shaft Z to rotate in the clockwise or counter-clockwise direction. The running wheels 3, mounted to shaft Z, together with the two running wheels 3' of the front shaft Z', cause the carriage to move along the rails 4 in the forward or backward direction.

To protect the operator, the circular saw blades I are provided with a guard 5 which is held in position by four spring snapping devices. The rails 4 are secured to the standards 6 and 6' by bolts 16 and 16'. On the standards are arranged screw jacks with hand-operated wheels and locking devices serving to hold and center the logs to be sawed and to adjust the log to the proper cutting height. The gripping device comprises two screw jacks 7 and 7' having hand-operated wheels 8 and 8' and arbors 9 and 9' respectively, the jacks being mounted in supporting arms 17 and 17' respectively. The arms 17 and 17' are slidably mounted on the standards 6 and 6' and can be lowered or raised by means of lifting devices. A log secured between the claws of the gripping device may be revolved about its axis. A locking device 10, however, having clutch-like notches spaced 90° from one another serves to fix the position of the log so as to enable an exact cutting of rectangular timber at right angles. The adjusting devices for lifting the log consist of screw jacks 11 and 11' which are actuated through bevel and spur gears 12 and 12' with the aid of hand-operated wheels 13 and 13' respectively. These adjusting devices act on the supporting arms 17 and 17' of the clamping devices.

Furthermore, a control device may be provided which influences the lifting devices in accordance with the reciprocating sawing machine (frame A) in such a manner that the work-piece is always raised to the desired height.

The machine which may be provided with saw blades of any suitable diameter, can be operated with a very high speed of operation. The completely fixed position of the work-piece and the accurate guide of the saw towards the log permit a high feeding speed of the saw blades so that cutting lengths of 4 to 5 meters per minute may be easily attained. The sawing device is reversible and cuts the work piece in either direction. The gripping device for the tree trunk ensures any rotation of the work-piece about its axis; i. e. the material can be cut at all sides without removing it.

What is claimed is:

A sawing machine comprising two standards spaced from each other, a stationary track removably mounted on said standards, a sawing unit placed on said track so as to be removable as a whole from said track, said unit comprising a carriage movable along said track, a sawing device mounted on said carriage, said device having a multiple set of double-acting blades, carriage wheels resting on said track and a motor also disposed on said carriage and operatively connected with said blades and said wheels for actuating said blades while impelling said carriage along said track, clamping means carried by said standards for securing a log below and in parallel relation to said track, and means disposed on said standards for vertically adjusting said clamping means relative to said track so as to ensure cutting of the log throughout its cross section.

ARTHUR KAEHLERT.